United States Patent Office 3,137,707
Patented June 16, 1964

---

3,137,707
PRODUCTION OF BENZENE CARBOXYLIC ACIDS
AND ANHYDRIDES
William D. Schaeffer, Pomona, Calif., assignor to Union
Oil Company of California, Los Angeles, Calif., a corporation of California
No Drawing. Filed June 26, 1961, Ser. No. 119,302
31 Claims. (Cl. 260—346.4)

This invention relates to the production of benzene carboxylic acids. Specifically, this invention relates to the production of terephthalic, orthophthalic and trimellitic acids from toluene; trimellitic and pyromellitic acids from xylenes; and pyromellitic acid from pseudocumene.

This application is a continuation-in-part of my copending applications, Serial Nos. 692,244 and 769,536 filed October 27, 1957 and October 27, 1958, both now abandoned.

Briefly, this invention comprises the oxidation of N-methylolamide substituted benzenes to oxidize the N-methylolamide group and produce the corresponding benzene carboxylic acid. In a more comprehensive sense, this invention relates to a two step process wherein a benzene or alkyl substituted benzene is first subjected to amidomethylation with a N-methylolamide, and in the second step the amidomethylated product is oxidized to produce the corresponding benzene carboxylic acid.

The benzene carboxylic acids are commonly produced by the oxidation of an alkylated benzene. The disadvantage of such a process resides in the difficulty and expense connected with the purification of the hydrocarbon distillates containing these polyalkylated benzenes to obtain relatively pure materials for the oxidation. It is also known that benzene xylenes and toluene can be alkylated to produce a mixture of isomeric dialkyl or trialkyl toluenes, and that the products can then be oxidized to the corresponding acids. The chief difficulty with this process resides in the non-selectivity of the alkylation reaction which tends to give about equal proportions of the ortho, meta and para dialkyl benzenes or mixed trialkyl isomers. Likewise, pseudo-cumene can be alkylated to produce a product which can be purified to result in a 1,2,4,5-tetra alkyl benzene suitable for oxidation to pyromellitic acid. The principal difficulty with all the aforementioned processes resides in the expensive and difficult isomer separation required to produce a high yield of the desired benzene polycarboxylic acid.

I have discovered that the amidomethyl group on an aromatic nucleus can be readily oxidized to a carboxylic acid group employing relatively mild oxidation with oxidation catalysts and techniques known in the art for the oxidation of alkyl groups on alkyl aromatics. I have also discovered that amidomethylation is very selective to the ortho and para position with little or no meta substitution. My process therefore utilizes these discoveries to prepare industrially useful benzene polycarboxylic acids in relatively high yields and purity.

The reactions involved in the process of my invention are as follows:

Preparation of the N-methylolamines as follows:

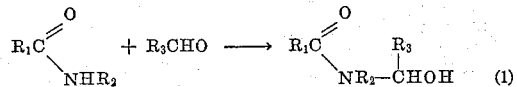  (1)

The amidomethylation reaction:

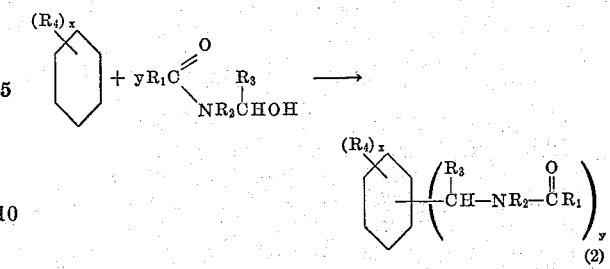

where $x$ is between 0 and 5 and $y$ is one or two.

Oxidation of the amidomethylated aromatics:

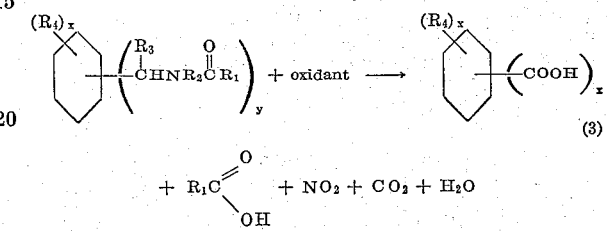

Oxidation of unoxidized alkyl groups:

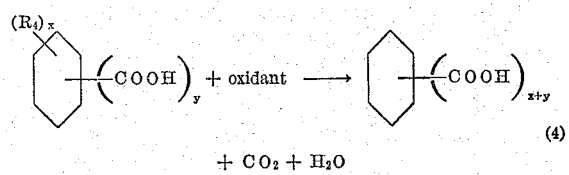

Recovery and amidation of carboxylic acid produced in reaction (3) above:

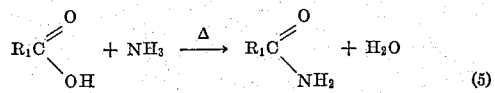

From preceding equations it can be seen that the process of my invention provides a relatively straightforward method for the preparation of polycarboxylic acids from benzene and substituted benzenes with use as raw materials of only ammonia and an aldehyde such as acetaldehyde or formaldehyde. If desired the oxidation reactions (3) and (4) can be combined into single severe oxidation step. Preferably this procedure is employed when N-methylolacetamide is employed, since the acetic acid produced in reaction (3) is stable even under the severe oxidation conditions necessary for reaction (4), and is still recoverable for reuse in the process.

Referring now to reaction (1), the N-methylolamides used herein are ordinarily prepared by reacting a carboxylic acid amide with formaldehyde or paraformaldehyde. As used herein, the term N-methylolamide is generic to N-methylolamides and to N-methylolamides having a substituent in the methylol group such as an alkyl, aryl or halo radical. Such amides are produced by use of aldehydes such as acetaldehyde, propanal, butanal, chloral, tolualdehyde, bromal, etc. in reaction (1) in lieu of formaldehyde. The preparation of the aforedescribed N-methylolamides is well known and hence need not be described in any further detail.

The N-methylolamides prepared by reaction (1) and which are free of interfering functional groups are employed herein for the amidomethylation. Such agents may be designated by the formula:

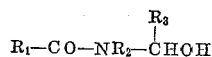

wherein $R_1$ may be a primary or secondary methylolamine, such as, another

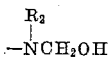

hydrogen, an alkyl radical such as methyl, ethyl, propyl, isopropyl, butyl, isobutyl, hexyl, dodecyl, etc.; and $R_2$ may be hydrogen, an alkyl radical such as methyl, ethyl, propyl, isopropyl, butyl, isobutyl, hexyl, dodecyl, or an alkylol radical such as formyl, acetyl, and the like. In any of the foregoing permutations, the terminal ends of the $R_1$ and $R_2$ radicals may be joined together to form a cyclic amide or imide. Suitable examples include N-methylol formamide, N-methylol acetamide, N-methylol propionamide, N-methylol-N-methyl formamide, N-methylol-N-methyl acetamide, N-methylol diacetamide, N-methylol succinimide, bis methylol urea, 2,5-diketopiperazine, and the like. The preferred class of N-methylolamides is represented by the formula:

wherein $R_1$ is hydrogen or a lower alkyl radical having from 1 to about 6 carbon atoms and is derived from the reaction of formaldehyde or paraformaldehyde with the corresponding carboxylic acid amide.

Suitable aromatic hydrocarbons which are amidomethylated according to reaction to include aromatics where $R_4$ is hydrogen or an alkyl or aryl radical and $x$ is from 0 to 5. Examples of such compounds are benzene, toluene, ethyl benzene, cumene, cymene, p-xylene, m-xylene, o-xylene, pseudocumene, p-ethyl toluene, m-ethyl toluene, o-ethyl toluene, masitylene, hemimellitene, p-diethylbenzene, m-diethylbenzene, o-diethylbenzene, 2-ethyl-p-xylene, 5-ethyl-m-xylene, 4-ethyl-o-xylene, durene, isodurene, n-dodecyl benzene, etc. Mixtures of such compounds may also be employed. In general any monocyclic or polycyclic aromatic or alkyl aromatic containing at least one active ring hydrogen atom can be amidomethylated.

The amidomethylation setup is conducted in the presence of an acidic catalyst, which may comprise substantially any strong acid which is non-oxidizing, and does not react with the substrate materials. Suitable catalysts include for example, sulfuric acid of a strength between about 50% and 100%, anhydrous hydrofluoric acid, trifluoroacetic acid, toluene sulfonic acid, benzene sulfonic acid, methane sulfonic acid, and the like. The preferred catalysts comprise liquid anhydrous hydrogen fluoride and the alkane sulfonic acids such as methane sulfonic acid, ethane sulfonic acid, propane sulfonic acid, butane sulfonic acid, and the like. Any of these preferred catalysts may be used in a mixture with a solvent such as acetic acid, dioxane, dialkyl sulfones, and the like. When sulfonic acids are employed, the highly advantageous system consists of acetic acid plus the sulfonic acid. For example, mixtures consisting of 10 to 60 volume percent of methane sulfonic acid and 40 to 90 volume percent acetic acid have been found to be highly advantageous. Mixtures of hydrofluoric acid with acetic acid also are highly useful but the hydrogen fluoride itself forms a good solvent for the reaction mixture.

A useful variation of sulfonic acid catalyst comprises sulfonated synthetic resins such as sulfonated phenylformaldehyde resins, known in the art under trade names such as Amberlite IR-120. These catalysts are preferably employed in a mixture with acetic acid or other acidic solvents. In all of the foregoing systems, acetic acid is doubly advantageous because it may be transferred directly to the oxidation step hereinafter described and used therein as the solvent. Other carboxylic acids are normally oxidized and hence do not present this particular advantage. However, from the standpoint of operativeness in the amidomethylation step, other aliphatic acids may be employed, e.g., formic acid, propionic acid, butryric acid, and the like.

The temperatures to be observed during the amidomethylation step may range from about 0° and 200° C., the optimum depending upon the condition of the particular catalyst employed. The more active catalysts such as liquid hydrogen fluoride, trifluoroacetic acid, or methane sulfonic acid, are preferably employed at temperatures between about 20° and 100° C. Optimum temperatures for the less active catalysts may range between about 50° and 150° C. Under these conditions of temperature and catalyst the reaction will ordinarily be completed within about 20 minutes to 2 hours. It is preferred to employ a mol excess of the hydrocarbon reactant (between about 1.05 and 3 mols per mol of N-methylolamide) when it is desired to add a single amidomethyl group to the benzene nucleus, in order that the N-methylolamide may be completely consumed. In some instances, diamidomethylation will be desired and this reaction is achieved by employing at least preferably to about 2 to 3 mols of the amidomethylol reactant per mol of alkyl benzene.

Following amidomethylation, it is preferred to remove the acid catalyst prior to the oxidation step. In the case of volatile catalysts such as hydrogen fluoride, this is accomplished, at least in part, by distillation. In the case of relatively non-volatile catalysts such as sulfonic acids and sulfuric acids, separation is best accomplished by quenching the reaction mixture in water and filtering the aqueous solution of catalyst acid, which may then be concentrated for reuse. Where a solvent is employed, it is preferably removed by distillation prior to the quenching of the reaction mixture in water for recovery of the non-volatile catalyst. In the case of volatile catalysts such as hydrogen fluoride, the acetic acid solvent need not be separated from the amidomethylated product, the entire mixture being transferred to the oxidation step following the removal of hydrogen fluoride by distillation.

The oxidation may be carried out according to procedures already known for oxidizing polyalkylbenzenes. Suitable methods are disclosed, for example, in U.S. Patents 2,276,774 or 2,479,067. When it is desired to combine oxidation reactions (3) and (4) in a single step oxidation, the preferred method consists in subjecting the amidomethylated product to air oxidation at temperatures of about 150° to 300° C., under superatmospheric pressures of, for example, 200 to 1000 p.s.i. in the presence of an oxidation catalyst which may comprise a soluble salt of a transitional metal, particularly the metals of groups VIB, VIIB and VIII of the Periodic Table. Lead, tin, and copper salts may also be employed. Preferred catalysts consist of the soluble salts of cobalt, nickel, iron, manganese, chromium, vanadium, lead and copper. Where acetic acid is employed as a solvent in the oxidation step, the corresponding acetates are preferably employed. However, other soluble forms of the metals can also be used, for example, the formates, propionates, butyrates, laurates, naphthenates, benzoates, and the like. Suitable complexes or chelates may also be employed.

Alternatively, the oxidation may be carried out in the absence of catalysts, using nitric acid as the oxidizing agent. Nitric acid varying in strength between about 20 and 80 weight percent can be used. Suitable temperatures range between about 125° C. and 225° C. When relatively concentrated nitric acid is employed, care should be exercised to prevent too violent a reaction with the amidomethyl group or groups. It may be necessary to employ cooling and careful addition rate to moderate the nitric acid oxidation.

In addition to the foregoing, still other oxidation techniques may be employed if desired, as for example, with potassium permanganate, chromic acid, or potassium dichromate. These techniques, however, are ordinarily too expensive for commercial use.

If desired, the oxidation reaction can also be carried out in the vapor phase employing free oxygen, preferably in the form of air, as the oxidizing agent in the presence of an oxidation catalyst. In accordance with conventional practice for oxidizing alkyl benzenes, the N-methylolamide substituted benzene reactant is vaporized with preheated air, and the gaseous mixture is passed in contact with a solid granular catalyst maintained as a fixed bed. If desired, however, the catalyst may be handled as a moving bed or in a fluidized state, employing any of the well known gas solids contacting techniques.

In general, the oxidation catalysts and the conditions under which the vapor phase oxidation reaction is carried out correspond to those generally employed for vapor phase oxidation of polyalkylbenzenes to the corresponding polybasic aromatic acids or anhydrides. Thus, the reaction is suitably carried out at oxidation temperatures between about 300° C. and 600° C. employing the air in large excess, for example, 10 to 200 times the theoretical amount. The flow rate is not particularly critical and may vary from as little as 0.10 mol to as much as 1 mol or more of the amide reactant per 100 cc. of catalyst per hour. Similarly, any of the wide variety of catalysts which are known to promote sidechain oxidation may be employed. For the most part, those catalysts comprise oxides or salts of the metals of Groups V to VIII of the Periodic Table, for example, oxides or salts of vanadium, chromium, manganese, iron, cobalt, molybdenum, platinum, etc. and are carried on an inert solvent supporting material such as alumina, silicon carbide, silica, etc. Mixed metal catalysts, for example, tin, vanadate, and mixtures of individual catalysts, e.g., a mixture of vanadium and molybdenum oxides, may also be employed. In accordance with conventional practice it is preferred to employ a vanadium catalyst, preferably one consisting of supported vanadium oxide. For fixed bed operation the catalyst particle size is satisfactorily between 4 and 10 mesh.

The aforedescribed vapor phase oxidation is preferably employed in the preparation of those benzene polycarboxylic acids having adjacent carboxylic groups and which therefore readily form their anhydrides, such as pyromellitic and orthophthalic acids. The acid anhydride products are readily recovered from the crude oxidates simply by cooling the latter to temperatures somewhat below the melting point of the anhydride to separate the latter as a solid from the carbon dioxide, water vapor, nitrogen oxides and other gaseous byproducts. The gaseous byproduct streams may then be further cooled to recover the desired values, for example, the nitrogen oxides and acetic acid, (produced when N-methylolacetamide is used as the amidomethylating reactant.)

Referring now to the liquid phase oxidation, the recovery of the product is as follows: the reaction mixture is vented to allow escape of gases and is then distilled to remove any solvent, as well as the acetic acid formed by oxidation of the amidomethyl group. The residue is then washed with cold water to remove any catalyst employed, nitric acid and other water soluble impurities. Upon extraction with warm or hot water, any water soluble benzene polycarboxylic acid such as orthophthalic acid present in the crude product is readily recovered. The remaining solids are the water insoluble polycarboxylic acids, for example, terephthalic acid.

As previously mentioned, the acetic acid byproduct of the oxidation can be converted to the N-methylolamide acid according to the reaction (5). Preferably the method consists of first reacting the acetic acid with ammonia and dehydrating to form acid amide. The acid amide is then reacted with more proportions of formaldehyde or paraformaldehyde at about 100° to 150° C. for a sufficient time, about 5 to 40 minutes, to form the N-methylolacid amide according to reaction (1). Alternatively, the acid amide and formaldehyde may be employed directly in the amidomethylation step, whereby the N-methylolacid amide is formed concurrently with amidomethylation.

As previously mentioned, the oxidation can be conducted in two steps, the initial step thereof being the oxidation of the amidomethyl group and the final step being the oxidation of the sidechain alkyl groups. In particular, I have discovered that the amidomethyl group is more readily oxidized than are tertiary carbons of appendant iso-alkyl groups. To conduct this oxidation, relatively mild conditions are employed in the first stage and it is preferred to conduct the oxidation in liquid phase with any of the aforedescribed oxidation catalysts comprising soluble salts of a transitional metal. Preferably the oxidation is conducted at atmospheric pressure under refluxing temperatures, e.g., 60° C. to about 125° C. If desired, dilute nitric acid, about 20% to about 50%, can be employed in the absence of a catalyst to achieve the desired oxidation. Suitable temperatures for the mild oxidation necessary are about 125° C. to about 250° C. To complete the oxidation of the alkyl group or groups, higher temperatures (about 50°–100° higher) are employed. Conducting the oxidation in two steps, with mild conditions being employed in the first step, is preferred when higher molecular weight carboxylic acids are employed in the amidomethylating reactant. Thus when propionic, butyric, valeric, acid, etc., are employed in the formation of the amide and methylolamide (reactions (5) and (1), respectively), the oxidation of the amidomethyl sidechain is conducted under mild conditions as in reaction (3) so as to recover the carboxylic acid for reuse in the formation of the N-methylolamide reactant. As previously mentioned, however, it is preferred to employ acetic acid since this acid is stable under the oxidation conditions necessary for complete oxidation of the alkyl sidechains to carboxylic acid groups and thus the oxidation can be employed in a single step under relatively severe conditions. Preferably when conducting a single stage oxidation, the oxidation is initiated at mild temperatures, 125° to 250° C., and completed at temperatures of about 200° to 500° C.

Referring now to specific applications of my invention, valuable benzene polycarboxylic acids can readily be prepared from alkyl benzenes. Terephthalic acid, valuable as a polymer intermediate, can readily be obtained in relatively pure yields from toluene. As previously mentioned, the amidomethylation reaction is selective to the ortho and para positions. Accordingly, amidomethylation of toluene results in a product having little or no meta substituted isomer. The yield of the para isomer can be improved even more by employing trifluoroacetic acid as the catalyst for the amidomethylation. I have found that toluene is amidomethylated chiefly in the para position with trifluoroacetic acid; the yield of the para isomer being up to 96% of the amidomethylated product, the balance being the ortho isomer. Accordingly, in the preparation of terephthalic acid, it is preferred to employ the trifluoroacetic acid catalyst. However, because the remaining amidomethylation catalyst, e.g., aqueous sulfuric acid, aryl sulfonic acids, alkane sulfonic acids, etc., are selective in their exclusion of any meta amidomethylated product, these catalyst can also be employed to amidomethylate toluene in the preparation of terephthalic acid. The yield of the amidomethylated product so obtained is composed of about equal amounts of the para and ortho isomers. Upon oxidation of this crude product, orthophthalic and terephthalic acids are produced. Upon extraction with warm or hot water, any orthophthalic acid present is readily recovered and the remaining solid is essentially pure terephthalic acid. Accordingly, a simple direct process for the separation of terephthalic acid is devised. Overall yields of dibasic acid, based upon the consumption of N-methylolamide range between about 70% and 90%. The yield based upon toluene converted is usually in excess of 90%.

Xylenes, particularly hydrocarbon distillate streams rich in xylenes, can readily be converted to trimellitic acid by the application of my invention. Such hydrocarbon distillates are composed primarily of various distributions of the ortho, meta and para xylene isomers, with varied amounts of ethylbenzene which has approximately the same boiling point range. The amidomethylation of paraxylene results in a product comprised entirely of the 1,2,4-amidomethylated xylene. The amidomethylation of meta xylene results in a product comprising chiefly the 1,2,4 isomer because the amidomethylation occurs on the position which is ortho and/or para to the methyl side-chain groups. Similarly the amidomethylation of ortho xylene results in a product rich in the 1,2,4 isomer because of the ortho-para directing properties of the side-chain alkyl groups. The amidomethylation of ethylbenzene will produce about equal amounts of the ortho and para amidomethyl-ethylbenzene. The crude amidomethylate can then be oxidized to yield directly to the benzene polycarboxylic acids, yielding trimellitic acid of a high purity from the 1,2,4 substituted benzene. Ortho and terephthalic acid byproducts are also formed from the amidomethylated ethylbenzene. These ortho and terephthalic acids can be readily separated from the trimellitic acid by known techniques such as distillation, extraction, etc.

Another valuable polycarboxylic acid which can be produced in high yields by my invention is pyromellitic acid. This acid or its anhydride can readily be obtained by the amidomethylation of pseudocumene followed by oxidation, or by the diamidomethylation of xylene followed by oxidation. I have found for instance that the amidomethylation of pseudocumene results in a nearly quantitative yield of N-(2,4,5-trimethyl)benzyl amide. This product can then be subjected to the aforedescribed oxidation conditions, preferably the oxidation in vapor phase with free oxygen in the presence of a group V to group VIII metal catalyst, e.g., vanadium pentoxide. The resultant pyromellitic anhydride product is recovered from the crude oxidate by cooling the latter to a temperature below the melting point of the anhydride and separating the condensed anhydrate as a solid from the carbon dioxide water vapor nitrogen oxide and other gaseous byproducts. When N-(2,4,5 - trimethyl)benzylacetamide is so oxidized, acetic acid byproduct of the reaction is readily recovered for reuse. This process thus provides a relatively direct method for the production of pyromellitic anhydride from pseudocumene. Since the latter is much more readily available than the prior art starting material (durene) the valuable advantages of my process are apparent. As an example, hydrocarbon reformates typically contain 8–12 times as much pseudocumene as durene.

Pyromellitic anhydride can also be obtained by the oxidation of a diamidomethylated benzylene, for example, the diamidomethylation of paraxylene results in a yield of a 1,4-dimethyl - 2,5 - diamidomethylbenzene. The diamidomethylation of ortho and meta xylene also results in products in which the aforementioned diamidomethyl xylene isomer is the chief product. The oxidation of this diamidomethyl isomer results in the production of pyromellitic anhydride which can be readily separated from the crude oxidate in the aforedescribed recovery method.

The preceding clearly demonstrates the ease with which my invention can obtain valuable benzene polycarboxylic acids from hydrocarbons rich in aromatics. To illustrate the application of my invention to specific embodiments thereof, the following examples are set forth:

EXAMPLE I

Toluene was subjected to amidomethylation with N-methylolacetamide batch-wise under varying conditions shown in Table 1 to obtain the results therein set forth. In each case, 0.26 mol of toluene and 0.2 mol of N-methylolacetamide was used:

Table 1

| Run No. | Catalyst and Solvent | Wt., Gms., Catalyst and Solvent | Reaction Temp., °C. | Reaction Time, Hrs. | Percent Yield [1] |
|---|---|---|---|---|---|
| 1 | H$_2$SO$_4$(Conc.) | 183 | 25 | 72 | 50 |
| 2 | CF$_3$COOH | 123 | 110 | 1 | 94.5 |
| 3 | CCl$_3$COOH | 80 | 110 | 1.5 | 40 |
| 4 | 10% toluenesulfonic acid in CH$_3$COOH. | 80 | 110 | 3 | 50 |
| 5 | 10% p-toluenesulfonic acid in CH$_2$ClCOOH. | 80 | 110 | 2 | 34 |
| 6 | 1:1 by vol. CH$_3$SO$_3$H in acetic acid. | 100 | 107 | 2 | 75 |
| 7 | 1:1 mol ratio ZnCl$_2$:H$_3$PO$_4$. | 60 | 50 | 2 | 43 |
| 8 | Liquid HF | 80 | 80 | 1 | 68 |
| 9 | HF and acetic acid, 1/1 by weight. | 80 | 80 | 1 | 88 |
| 10 | Liquid HF | 80 | 25 | 2 | 83 |

[1] Yield of o- and p-acetamido toluene based on N-methylol acetamide taken.

This example shows that toluene may be treated under the conditions herein preferred to obtain excellent yields of ortho and para acetamidomethyl toluene, to the practical exclusion of the meta isomer.

The data also shows that certain of the above catalysts are outstanding in giving high yields in a short period of time. These preferred catalysts (trifluoroacetic acid, liquid HF, and methane sulfonic acid, with or without added acetic acid) are also extremely useful for amidomethylation with other N-methylol amides, e.g. N-methylol formamide, N-methylol propionamide, N-methylol benzamide, N,N'-dimethylol succinamide, N-methylol phthalimide, and the like. They are also effective for the amidomethylation of aromatics in general, e.g. benzene, naphthalene, xylenes, nitrobenzene, phenol, naphthols, or in general any aromatic compound which contains a ring-hydrogen atom and is free of interfering functional groups.

EXAMPLE II

An 81 gram sample of mixed o- and p-acetamidomethyl toluene produced as in Run 10 of Example 1, is dissolved in 200 ml. of glacial acetic acid to which 1 gram of cobalt acetate and 1 gram of ammonium bromide are added. The mixture is then placed in an autoclave and pressured with oxygen to a pressure of about 500 p.s.i.g., the temperature being maintained at about 175° C. After about one hour, the consumption of oxygen decreases rapidly as indicated by decreasing pressure drops, and the reaction is terminated. Upon distilling the reaction mixture 226 ml. of acetic acid is recovered, showing that the oxidation may be effected without oxidizing acetic acid, while recovering substantially all of the acetic acid from the acetamidomethyl groups. The yield of mixed terephthalic and o-phthalic acids (predominantly terephthalic) is substantially quantitative.

EXAMPLE III

Another 81-gram sample of the mixed o- and p-acetamidomethyl toluenes is placed in an autoclave and subjected to oxidation with 30% nitric acid at a temperature of 150° C. The acid is added gradually with stirring. After adding about 550 ml. of acid, the reaction subsides somewhat. About 350 ml. more of the acid is then added, and the temperature is raised to 200° C. for about thirty minutes. Upon draining the excess acid from the reaction mixture and washing the residue with water to leach out o-phthalic acid, pure terephthalic acid remains, yield about 45% based on the total mixture of acetamidomethyl toluenes taken. Upon evaporation the mother liquor gives a 40% yield of o-phthalic acid.

Ethylbenzene, n-propylbenzene, or isopropylbenzene may be substituted for toluene in the foregoing examples, with approximately the same yields of total product being obtained. In the case of isopropylbenzene, a lesser yield of o-phthalic acid is obtained, and a correspondingly increased yield of terephthalic acid.

EXAMPLE IV

Approximately 92 parts of trifluoroacetic acid are charged to a corrosion-resistant reaction vessel equipped with a stirrer and an air-cooled reflux condenser. There are then added about 300 parts (0.25 mol) of pseudocumene and about 17.8 parts (0.2 mol) of N-methylolacetamide. The trifluoroacetic acid serves the dual function of catalyst and liquid reaction medium. The reaction mixture is allowed to stand overnight at room temperature (30°–40° C.), and is thereafter poured into 5 volumes of a 5% aqueous solution of sodium hydroxide. The white crystalline product which is thereby precipitated is filtered off, washed with water, and air-dried at room temperature. The dried product is substantially pure N-(2,4,5-trimethylbenzyl)-acetamide, and is obtained in almost quantitative yield. N-(2,4,5-trimethylbenzyl)-formamide is similarly obtained by substituting N-methylol-formamide for the N-methylol-acetamide.

The following examples will illustrate the oxidation of trimethylbenzyl-substituted amides to form pyromellitic anhydride in accordance with the process of the invention, but are not to be construed as limiting the invention.

EXAMPLE V

Molten N-(2,4,5-trimethylbenzyl)-acetamide, obtained from pseudocumene as described in Example IV, is passed at a rate of about 19 grams per hour through a ¼-inch stainless steel preheating coil which is immersed in a molten salt bath maintained at a temperature of about 250° C. Simultaneously, air is passed through a similar preheating coil at a rate of about 50 cu. ft./hr. At the end of the preheating coils the two preheated streams are joined and passed through a reaction tube mounted in an electric furnace set at a temperature of about 450° C. The reaction tube is a 3-foot length of ½-inch stainless steel tubing packed with 70 cc. of a 10-mesh granular catalyst comprising vanadium pentoxide supported on alumina. The gaseous product passing from the reaction tube is passed through a product recovery train comprising an air-cooled condenser, a water-cooled condenser, and low temperature well. The pyromellitic anhydride product condenses on the walls of the air-cooled condenser as a white solid. The amount of pyromellitic anhydride collected after two hour's operation is 38.5 grams, corresponding to a yield of about 88 percent of theoretical.

EXAMPLE VI

Example V is repeated as follows, employing larger scale apparatus.

| | |
|---|---|
| Feed rate of amide reactant _____ mol/hr__ | 0.5 |
| Feed rate of air _____ mols/hr__ | 650 |
| Amount of catalyst _____ cc__ | 3,000 |
| Identity of catalyst _____ | [1] $V_2O_5$ |
| Reaction temperature, ° C. _____ | 550 |

[1] On Alundum.

The yield of pyromellitic anhydride is about 90 percent of theoretical. Substantially identical results are obtained employing N-(2,4,5-trimethylbenzyl)-formamide as the amide reactant and tin vanadate as the catalyst.

EXAMPLE VII

Paraxylene is diamidomethylated by adding the paraxylene to a small pressure bomb containing 40 milliliters of acetic acid. The bomb is chilled in an ice bath and 40 milliliters of liquid hydrogen fluoride is added and the bomb covered and thereafter warmed to about room temperature. N-methylol-acid amide in an amount corresponding to 2 mols per mol of paraxylene reactant is then slowly added and the mixture is shaken at room temperature for 1 hour. After the hour, the bomb contents are poured into ice water and a white granular solid precipitates. This solid is filtered off, air dried to show a yield of 62.5% based on the N-methylolamide. The clear and colorless filtrate is reacted with excess cold dilute potassium hydroxide resulting in the separation of an additional solid brown material. Upon filtration and air drying the total yield of dialkylated paraxylene was about 87%. Analysis of this product showed it to be comprised chiefly of the 1,4-dimethyl-2,5-diamidomethyl isomer.

Paraxylene is diamidomethylated with sulfuric acid in acetic acid solvent as follows: To a beaker is added a mixture of acetic and sulfuric acids. The N-methylolamide is then added to the acid, the flask cooled in an ice bath and, thereafter, p-xylene is slowly added. After the p-xylene has been added in an amount corresponding to 1 mol of p-xylene per 2 mols of N-methylolamide, the beaker is heated to 90° C. for a half hour period and then maintained at about 80° C. for a 2 hour period. Thereafter the contents of the flask are cooled, poured into ice water and neutralized with concentrated ammonium hydroxide. The resultant white precipitate is filtered and weighed and corresponds to an 80% yield of a diamidomethylated paraxylene.

EXAMPLE VIII 2,5-diamidomethyl-p-xylene obtained as described in Example VII is heated to slightly above its melting point, about 275° C., and then passed at a rate of about 15 g. per hour through a ¼ inch stainless steel preheating coil in the manner described in Example V. Air is admitted as described in Example V. The preheated streams are joined and passed through a reaction tube in an electric furnace at a temperature of about 450° C. The reaction tube is packed with the vanadium pentoxide-aluminum catalyst. The resultant product is passed through the air cooled condenser, water cooled condenser and low temperature well and the pyromellitic anhydride product separates as a white solid. The yield of pyromellitic anhydride from this procedure can correspond to a yield of about 75 to 95% theoretical.

EXAMPLE IX

A hydrocarbon distillate having a boiling point range of 137° to 143° C. and comprised chiefly of a mixture of xylene isomers and minor amounts of ethylbenzene is subjected to amidomethylation with N-methylolacetamide at 90° C. for a two-hour period with aqueous sulfuric acid (70 volume percent sulfuric) as a catalyst. A mol excess of hydrocarbon reactant is maintained to prevent undesired side reactions. After the two hour period the aqueous phase is separated and the hydrocarbon phase is oxidized with 30 percent nitric acid at a temperature about 190° C. using about 10 mols of nitric acid per mol of hydrocarbon. After one hour, the crude oxidate is filtered to remove the small amount of terephthalic acid formed from oxidation of the para amidomethylated ethyl benzene. The filtrate is evaporated to recover the excess nitric acid oxidant and acetic acid suitable for reuse in the overall process (reaction 5).

The resulting non-volatile acid product is comprised chiefly of trimellitic acid with slight amounts of hemimellitic and trimeric acids. Some orthophthalic and terephthalic acid is also present, having been formed from ethylbenzene in the hydrocarbon distillate.

EXAMPLE X

Cumene is amidomethylated by adding 30 grams of the hydrocarbon to 50 milliliters of trifluoroacetic acid. Thereafter 20.4 grams of N-methylolpropanamide are slowly added over a ten minute period. After the addition, the reactants are heated at 70–80° C. for forty minutes. The reactants are thereafter treated by evaporating off excess trifluoroacetic acid and the residue is poured into cold dilute potassium hydroxide. The resultant aqueous mixture is extracted with ethyl ether to recover about a 60 percent yield (based on N-methylolpropanamide reactant) of para amidomethylated cumene.

Ten grams of the para amidomethylated cumene is added to a flask containing 100 milliliters of acetic acid and 0.4 gram of cobalt tetrapyridine dibromide complex. Oxygen is bubbled through the flask at reflux temperatures for 2 hours. At the end of two hours, the flask contents are heated to recover excess acetic acid solvent and the propanoic acid byproduct of the oxidation. The residue is diluted with water and made alkaline with potassium hydroxide. The solution is then filtered and acidified with hydrochloric acid to precipitate the para cumic acid which had a melting point of 116°–118° C.

Other modes of applying the principle of my invention may be employed instead of those explained, change being made as regards to method or materials employed, provided the step or steps stated by any of the following claims, or the equivalent of such stated step or steps, be employed.

I claim:

1. The method of preparing a benzene polycarboxylic acid which comprises subjecting an alkyl benzene to amidomethylation with an N-methylolamide of a carboxylic acid in the presence of an acidic condensation catalyst at a temperature between about 0° and 200° C., to thereby produce an amidomethylated alkyl benzene, subjecting said amidomethylated alkyl benzene to oxidation with an added oxidizing agent to convert the amidomethyl and alkyl appendant groups to carboxylic acid groups, recovering the benzene polycarboxylic acid and carboxylic acid from the oxidation mixture and reacting said carboxylic acid with ammonia and formaldehyde to regenerate said N-methylolamide for use in the amidomethylation step.

2. The method of claim 1 wherein said benzene polycarboxylic acid is terephthalic acid, said alkyl benzene is toluene and said catalyst is trifluoroacetic acid.

3. The method of claim 1 wherein said benzene polycarboxylic acid is orthophthalic acid, said alkyl benzene is toluene and said catalyst is anhydrous hydrogen fluoride.

4. The method of claim 1 wherein said benzene polycarboxylic acid is trimellitic acid, said alkyl benzene is toluene and said N-methylolacetamide is employed at a mol ratio to toluene between about 2 and about 3 so as to diacetamidomethylate said toluene reactant.

5. The method of claim 1 wherein said benzene polycarboxylic acid is trimellitic acid and said alkyl benzene is xylene.

6. The method of claim 1 wherein said benzene polycarboxylic acid is pyromellitic acid, said alkyl benzene is xylene and said N-methylolacetamide is employed at a mol ratio to xylene between about 2 and about 3 so as to diacetamidomethylate said xylene.

7. The method of claim 1 wherein said benzene polycarboxylic acid is pyromellitic acid and said alkyl benzene is pseudocumene.

8. The method wherein said benzene polycarboxylic acid is mellitic and said alkyl benzene is durene.

9. A method for preparing terephthalic acid which comprises subjecting a mono-lower alkyl benzene to amidomethylation with N-methylolamide of a carboxylic acid in the presence of an acidic condensation catalyst at a temperature between about 0° and 200° C., to thereby produce a para-(amidomethyl) alkyl benzene, subjecting said para-(amidomethyl) alkyl benzene to oxidation with an added oxidizing agent to convert each para substituent to a carboxylic acid group, recovering terephthalic acid and carboxylic acid from the oxidation mixture and reacting said carboxylic acid with ammonia and formaldehyde to regenerate N-methylolamide for use in said amidomethylation step.

10. A method as defined in claim 9 wherein said acidic condensation catalyst is liquid HF.

11. A method as defined in claim 9 wherein said acidic condensation catalyst is a mixture of acetic acid plus HF.

12. A method as defined in claim 9 wherein said acidic condensation catalyst is a mixture of acidic acid plus an organic sulfonic acid.

13. A method for preparing terephthalic acid which comprises subjecting toluene to amidomethylation with N-methylolacetamide in the presence of (1) an acidic condensation catalyst, and (2) a solvent which is essentially acetic acid, at a temperature between about 0° and 200° C., to thereby produce ortho- and para-acetamidomethyl toluene, removing said acidic condensation catalyst from the reaction product and then subjecting the remaining mixture of ortho- and para-acetamidomethyl toluenes to oxidation with an added oxidizing agent in the presence of said acetic acid solvent, and recovering from the oxidation mixture o-phthalic acid, terephthalic acid and acetic acid, reacting a portion of the acetic acid recovered from said oxidation step with ammonia and formaldehyde to produce N-methylolacetamide, and recycling said N-methylolacetamide plus excess acetic acid to said amidomethylation step.

14. A method as defined in claim 13 wherein said acidic condensation catalyst is anhydrous HF.

15. A process as defined in claim 31 wherein said oxidation is effected with molecular oxygen at a temperature between about 150° and 300° C. in the presence of a transitional metal catalyst.

16. A process as defined in claim 31 wherein said oxidation is effected with nitric acid of 20% to 60% strength at a temperature between about 125° C. and 225° C.

17. A method for preparing a benzene dicarboxylic acid which comprises subjecting a mono-acetamidomethyl mono-lower alkyl benzene to oxidation with an added oxidizing agent to convert each ring substituent to a carboxylic acid group, and recovering a benzene dicarboxylic acid.

18. A process as defined in claim 17 wherein said monoacetamidomethyl mono-lower alkyl benzene is para-acetamidomethyl toluene.

19. A process as defined in claim 17 wherein said oxidation is effected with molecular oxygen at a temperature between about 150° and 300° C. in the presence of a transitional metal catalyst.

20. A process as defined in claim 17 wherein said oxidation is effected with nitric acid of 20% to 60% strength at a temperature between about 125° C. and 225° C.

21. The process for the production of pyromellitic anhydride which comprises oxidizing a reactant selected from the class consisting of N-(2,4,5-trimethyl)-benzyl-formamide and N-(2,4,5-trimethyl)-benzyl-acetamide in the vapor phase, said oxidizing being effected in the presence of an oxidation catalyst selected from the class consisting of the oxides and salts of the metals of Groups V to VIII, inclusive, of the Periodic Table, and employing a gas containing free oxygen as substantially the sole oxidizing agent.

22. A process as defined by claim 21 wherein the said oxidizing agent is air.

23. A process as defined by claim 21 wherein the said oxidation catalyst is an oxide of a metal of Groups V to VIII of the Periodic Table, said metal oxide being carried on an inert solid catalyst support material.

24. A process as defined by claim 21 wherein the said oxidation catalyst is an oxide of vanadium carried on an inert solid catalyst support material.

25. A process as defined by claim 21 wherein the said oxidation is effected at an oxidation temperature between about 300° C. and about 600° C., and said oxidizing agent is air provided in an amount representing between about 10 and about 200 times the amount theoretically required to oxidize the said reactant to pyromellitic anhydride.

26. A process as defined by claim 21 wherein the said reactant is N-(2,4,5-trimethyl)-benzyl-acetamide.

27. The process for preparing pyromellitic anhydride which comprises reacting pseudocumene with an amide selected from the class consisting of N-methylolformamide and N-methylol-acetamide, said reaction being carried out in the liquid phase at a reaction temperature between about 0° C. and about 200° C. in the presence of a catalytic amount of a strong acid condensation catalyst; recovering a product selected from the class consisting of N(2,4,5-trimethyl)-benzyl-formamide and N-(2,4,5-trimethyl)-benzyl-acetamide from the reaction mixture so obtained; subjecting said recovered product to oxidation in the vapor phase with a free oxygen-containing gas in the presence of an oxidation catalyst selected from the class consisting of the oxides and salts of the metals of Groups V and VIII, inclusive, of the Periodic Table; and recovering pyromellitic anhydride from the crude oxidation product.

28. A process as defined by claim 27 wherein the said oxidation catalyst is an oxide of a metal of Groups V to VIII of the Periodic Table, said metal oxide being carried on an inert solid catalyst support material.

29. The process for preparing pyromellitic anhydride which comprises reacting pseudocumene with N-methylol-acetamide at a temperature between about 20° C. and about 150° C. in the presence of a catalytic amount of a strong acid condensation catalyst and under sufficient pressure to maintain the reaction mixture in the liquid phase; recovering N-(2,4,5-trimethyl)-benzyl-acetamide from the reaction product so obtained; admixing said recovered N-(2,4,5-trimethyl)-benzyl-acetamide with an amount of air from about 10 to about 200 times the amount theoretically required to oxidize the N-(2,4,5-trimethyl)-benzyl-acetamide to pyromellitic anhydride; passing the mixture of air and N-(2,4,5-trimethyl)-benzyl-acetamide in contact with a granular supported vanadium oxide oxidation catalyst at a rate corresponding to between about 0.10 and about 1 mol of N-(2,4,5-trimethyl)-benzyl-acetamide per 100 cc. of catalyst per hour while maintaining an oxidation temperature between about 300° C. and about 600° C.; and recovering pyromellitic anhydride from the reaction product so obtained.

30. The process for the production of pyromellitic anhydride which comprises forming a gaseous mixture of air and N-(2,4,5-trimethyl)-benzyl-acetamide, the amount of air present in said mixture being from about 10 to about 200 times that theoretically required to oxidize said reactant to pyromellitic anhydride; passing said mixture in contact with a supported metallic oxide oxidation catalyst at an oxidation temperature between about 300° C. and about 600° C.; and recovering pyromellitic anhydride from the reaction product thereby produced.

31. The preparation of an aromatic carboxylic acid which comprises subjecting to oxidation the amidomethyl group of an amidomethyl aromatic defined as follows:

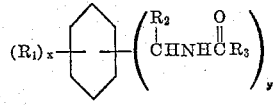

wherein:

$x$ is an integer between 0 and 5 inclusive;

$y$ is an integer greater than 0 and less than 3;

$R_1$ is selected from the class consisting of alkyl and aryl groups;

$R_2$ is selected from the class consisting of hydrogen, alkyl, aryl and halo radicals; and $R_3$ is a member selected from the class consisting of hydrogen, alkyl and methylolamines having the following structure:

wherein:

$R_4$ is selected from the class consisting of hydrogen, alkyl, aryl and alkylol groups;

said oxidation being effected with an added oxidizing agent under conditions to convert said amidomethyl group to a carboxylic acid group and recovering said aromatic carboxylic acid.

References Cited in the file of this patent

Degering: An Outline of Organic Nitrogen Compounds (1945), pages 496–8.

Ephraim: Inorganic Chemistry (Sixth English Edition, 1954), page 719.